United States Patent [19]

Kueper et al.

[11] 4,265,918

[45] May 5, 1981

[54] PREPARATION OF PARTIALLY DEHYDRATED MEAT PRODUCTS

[75] Inventors: Theodore V. Kueper, LaGrange; Warren R. Schack, Western Springs; Harry Rock, Wood Dale, all of Ill.

[73] Assignee: Swift & Company, Chicago, Ill.

[21] Appl. No.: 4,727

[22] Filed: Jan. 19, 1979

[51] Int. Cl.³ .......................... A23B 4/02; A23L 1/31
[52] U.S. Cl. .................................. 426/264; 426/315; 426/473; 426/641
[58] Field of Search ............... 426/262, 264, 281, 315, 426/641, 645, 443, 465, 473, 518, 520, 385, 404, 418

[56] References Cited

U.S. PATENT DOCUMENTS

| | | | |
|---|---|---|---|
| 96,978 | 11/1869 | Sherwood | 426/641 |
| 2,402,674 | 6/1946 | Schaffner | 426/465 X |
| 2,502,115 | 3/1950 | Zimmermann | 426/641 X |
| 2,528,832 | 11/1950 | Johnson | 426/404 X |
| 2,627,473 | 2/1953 | Brissey | 426/641 X |
| 3,169,070 | 2/1965 | Mehrlich et al. | 426/385 |
| 3,220,854 | 11/1965 | Zwart | 426/641 X |
| 3,304,617 | 2/1967 | Jeppson | 34/5 |
| 3,532,511 | 10/1970 | Binkerd et al. | 426/641 X |
| 3,595,679 | 7/1971 | Schoch et al. | 426/315 X |
| 3,634,102 | 1/1972 | Paynter et al. | 426/404 |
| 3,914,444 | 10/1975 | Svacik | 426/418 X |
| 3,961,568 | 6/1976 | Jeppson | 99/339 |
| 3,961,569 | 6/1976 | Kenyon et al. | 99/451 |

OTHER PUBLICATIONS

*Meat Industry*, 11-1977, pp. 20, 21 & 73.

*Primary Examiner*—Arthur L. Corbin
*Attorney, Agent, or Firm*—Charles E. Bouton

[57] ABSTRACT

A partially dehydrated food product, especially sliced bacon, that results in improved cooked yield and reduced shrinkage is prepared by subjecting the product to hydration with a curing solution and then to vacuum dehydration conditions to partially, but not totally, reduce the moisture content without substantially affecting the other food components.

4 Claims, No Drawings

PREPARATION OF PARTIALLY DEHYDRATED MEAT PRODUCTS

This invention relates to an improved food product and a method for producing same; and more specifically the present invention relates to an improved sliced meat product, such as bacon, and a method for producing the sliced meat product, which is intended for cooking prior to eating by a consumer.

Many food products, particularly meat products, require cooking at the location of consumption because there is a preference for the food to be hot when served or because the consumer (or the preparer of the food) prefers to personally cook and otherwise prepare the food. However, such foods may be cooked by the manufacturer or processor and then distributed to consumers who eat the product either unheated or after warming. Most foods will undergo weight loss during cooking due to the vaporization or migration of water and other liquid (or liquefiable) components of the food. This loss is known as a "reduction in yield" or shrink of the food, and it may represent a significant reduction of available food value and flavor.

For instance sliced bacon is a popular food item largely favored as a fried breakfast dish, but also found appealing at other meals and often in combination with other meat items (steak wrapped in bacon, liver and bacon, etc.) and in cold salads in a reduced (crumbled) form. (For the purpose of this disclosure it is intended that the term "bacon", in addition to the traditional product meeting federal standards, will also include as equivalents the various synthetic and substitute products often known as "breakfast strips" which may be made from beef carcasses or reconstituted and formed meats, including poultry meat.) However, bacon, as does all meats, contains some natural moisture and may have added water due to curing procedures, and has a substantial fat content, all of which are partially released from the product upon cooking. Normal cooking conditions will cause a loss of as much as 75% by weight of the uncooked bacon. Furthermore this release of moisture is accompanied by spattering (the eruption of moisture and fat from the product and cooking surface) which soils the area surrounding the cooking surface and may cause burns upon the skin of the cook person. While some loss of fat from the bacon may be desired from the palatability standpoint, the normal reduction in yield of this product is excessive and robs the consumer of worthwhile caloric and other metabolic and digestive values that fat represents in a healthful human diet. There may also be some loss of protein values. The loss of fat at cooking temperature is also rapid and often results in the bacon being over cooked beyond the degree of doneness preferred by the consumer with consequent excessive dimensional reduction and pan "burn on". Furthermore, the spattering of hot fat and moisture during cooking is notoriously unpleasant.

Accordingly, it would be of tremendous advantage to both the consumer and the preparer of food products, particularly meats such as sliced bacon, if the product could be altered prior to cooking in a way to reduce cooking losses and to lessen the tendency to spatter upon cooking.

Therefore, it is a principle object of the present invention to devise an improved food product, and an improved method of preparation of said product, that will undergo significantly less loss of weight upon being cooked as compared to unimproved food product.

It is a further object of this invention to provide an improved meat product, and an improved method for producing such product, which meat product upon being cooked will undergo less loss of moisture and fat and will spatter less than a similar product that is not so improved.

It is still another object of this invention to provide an improved sliced meat product, and an improved method for producing such product, which product during cooking will shrink less in both weight and size, will spatter and char less, and will have less tendency to become overcooked than similar unimproved product will experience under the same cooking conditions.

It is yet another object of this invention to provide an improved sliced bacon type product, and an improved method for producing such bacon type product, which during cooking will lose comparably less moisture and fat, will spatter less, and will have less tendency to become overcooked than similar unimproved bacon will experience under the same cooking conditions.

It is still a further object of the present invention to provide an improved sliced bacon, and an improved method for producing such bacon, which may be either substantially raw, partially cooked or pre-cooked, and will be able to be cooked to a desired degree of doneness in a shorter period of time than required for unimproved bacon.

In general the present invention involves the partial dehydration (removal of a portion, but not all, of the releasable water) of the food product, such as bacon, under conditions that will not appreciably cook or otherwise alter the physical appearance and content of the product. It is important that the dehydration conditions will not cause an appreciable reduction of fat or oil from the food product. Preferably the food, such as bacon, is reduced by about 55% of its original moisture present in the uncooked state (cured bacon not exceeding 110% of its original raw uncured weight is typically dehydrated to about 80% of its cured weight). The preferred technique for dehydration is to subject the food product to subatmospheric pressure. Dehydration may be facilitated by first subdividing the product, as by slicing, so as to maximize the surface area exposed to dehydrating conditions. Slicing may instead be performed after the dehydration.

Further objects and advantages will become apparent upon reading the following detailed description of an embodiment of the invention.

A preferred embodiment of the invention pertains to the production of sliced bacon, and the following description is directed specifically thereto. However, it will be apparent that the invention is applicable to other foods, particularly sliced foods, and most importantly to a variety of meats, meat products, sliced meats and especially sliced meat products including natural meats and reformed meat products, and patties and the like.

In the manufacture of bacon for consumers raw uncured pork bellies (sometimes known to the trade as "green bellies") may be first trimmed of skin and excess fat and then treated with an aqueous solution of curing and flavor agents according to any of several well-known practices. The curing solution may contain salt, sugar, phosphate, liquid smoke, sodium erythorbate acidulants, bacterial cultures and nitrite in addition to water; and is introduced into the meat structure by soaking, tumbling, or injecting the meat sufficiently to hydrate the meat to 105%–125% of its original "green" weight. (Raw or "green" bellies normally contain about 35% moisture and 55% fat.) Injection by a process known as stitch pumping is common in the industry and is an efficient practice.

The preceding steps are well-known and do not form an integral part of the present invention.

The injected (hydrated) bellies may be smoked if desired although that is not necessary, particularly where liquid smoke is included in the aqueous curing formula. However, to meet government standards the bacon must be returned to its "green" weight by cooking, smoking or otherwise before it is sold by the processor. The bellies may be chilled for firmness so as to facilitate slicing and also may be held for a period of time to permit the curing formula to diffuse into the meat tissue.

According to the present invention the injected bacon is subjected to controlled drying conditions to reduce the weight to 70%–95% of the original "green" weight. The bellies may be dried intact or subdivided. However, it is preferred to first slice the bacon into regular consumer size slices (approximately 0.1 inch thick) and to expose the slices either in shingled (overlapped) or unlapped attitude to a dehydrating environment, preferably subatmospheric pressure or vacuum.

Since bacon is normally sliced on high speed equipment and arranged in shingled drafts (for the retail trade) or unlapped drafts (for commercial or mass feeding trade) it is expeditious to dry the bacon slices while arranged in such drafts.

A preferred dehydration procedure is to expose the drafts of product to full vacuum (4 mm–0.9 mm Hg) for a period of time sufficent to reduce total weight to about 85%–95% of the original unhydrated "green" weight. The time requirement is dependant upon the amount of product surface directly exposed to the environment, product and ambient temperature, and the degree of vacuum and type of vacuum equipment. The application of supplemental heat may assist dehydration but must be limited to avoid rendering of fat or altering of protein. Preferably application of heat is limited to only that amount necessary to prevent the product from freezing during vacuum drying. However, temperature of the product may range from 0°–80° F. and may vary and increase within that range during the dehydration step. Alternately, it is possible to apply sufficient heat following initial vacuum exposure to effectively precook the product during this operation. Heat may be applied by radiation, such as infra red and microwave, and by conduction as by warming the structure supporting the bacon drafts. Microwave heating in conjunction with vacuum dehydration is advantageous in that microwave energy tends to affect water molecules and thereby facilitates the removal of moisture from the product. In practice a supporting shelf temperature of 120° F. was sufficient to effectively prevent the freezing of product due to evaporative cooling during a vacuum drying cycle of 50–200 minutes.

The foregoing procedure may be advantageously applied to cold bacon bellies that have not been smoked or precooked to any degree. If the bellies are sliced and overlapped before vacuum drying there may be a tendency for the slice surfaces (possible primarily the lean surfaces) to stick together and make slice separation somewhat difficult. The hydrated bacon bellies may also be heat treated under known smoke house conditions which will also partially reduce the moisture content of the bellies. However, to obtain the full benefits of the present invention it is essential to follow the heating and/or smoking step with a vacuum drying step. This procedure of combined heating-smoking and vacuum dehydration appears to reduce the tendency for slices to become stuck together during vacuum treatment. Where these procedures are combined it is preferred that the heating-smoking procedure be terminated while the bellies remain hydrated to a weight in excess of green weight (typically about 105% of green weight) and that the bellies are then vacuum dehydrated to about 80–85% of green weight. A further advantage of this procedure is that following heating-smoking the bellies may be more readily shaped (as by pressing) for efficient slicing and to minimize trimming losses.

After the product has been partially dehydrated according to the foregoing procedure it may be packaged in a conventional manner and distributed to consumers.

It has been found that sliced bacon processed in the foregoing manner upon cooking provides a noticeably greater yield of edible meat. During subsequent frying the sliced bacon has been noted to shrink less dimensionally and to cause remarkably less spatter than bacon processed in a heretofore conventional manner without partial dehydration. Cooking time also appears to be reduced and the cooking surface is left cleaner (less burn-on of product) than with conventional commercially prepared bacon.

It is also believed that product treated in accordance with the present invention will have an improved and lengthened shelf life and will resist the development of microorganisms (including *clostridium botulinum*) due to the lowered water activity factor (Aw) resultant from partial dehydration. The described procedures will result in bacon with an Aw value of about 0.9 which is below the level at which botulinum is thought to grow or produce toxin.

The following examples demonstrate the invention. In these examples where processed bacon is produced from, or a comparison is made with conventionally processed bacon (referred to as "commercial" bacon) the product was commercially obtained under the brand "SWIFT PREMIUM" and was known to have been cured with a solution containing proprietary amounts of salt, sugar, phosphate, sodium erythorbate and sodium nitrite and smoked in a smokehouse to approximately 125°–130° F. to a finished weight of 100% of the "green weight". Bacon prepared according to the present invention is referred to as "new process". Also in these examples, unless otherwise stated the bacon processed according to the present invention was cured with a solution containing identical amounts of the above noted agents used in producing SWIFT PREMIUM brand bacon except liquid smoke was also added. Where either commercial or new process bacon product was cooked it was fried at 325° F. (pan surface temperature) to visual doneness on a WEST BEND brand electric grill. Also in the following examples product was partially dehydrated while arranged in shingled slice (overlapped) drafts except where otherwise specified (as "dried in single slice"); and drying was accomplished in a twenty-four cubic foot capacity "Stokes" (trade name) freeze dryer.

EXAMPLE I

In this example equal numbers of slices of commercial and new process bacon were partially dehydrated (except for control samples) for the stated times by subjecting product to full vacuum (29.99 in. Hg) and adding sufficient heat to prevent product from freezing (120° F. shelf temperature) during drying. The processed samples were obtained from bacon bellies that had been pumped with curing solution to 110% of green weight and were not otherwise dehydrated before vacuum processing.

|  | I<br>Dehy.<br>Time | II<br>Dehy.<br>Yield as %<br>of Green Wt. | III<br>Cooked<br>Yield as %<br>of Col. II | IV<br>Final Yield<br>% of Green<br>Weight |
|---|---|---|---|---|
| Commercial Bacon |  |  |  |  |
| 1. Dried in single slice | 50 min. | 73.0 | 42.6 | 31.1 |
| 2. Dried in single slice | 80 min. | 68.0 | 43.4 | 29.5 |
| 3. Control-no drying | Zero | 100.0 | 31.8 | 31.8 |
| 4. Draft-dried | 50 min. | 87.2 | 37.74 | 32.9 |
| 5. Draft-dried | 80 min. | 84.0 | 36.0 | 30.24 |
| New Processed Bacon |  |  |  |  |
| 1. Single slice dried | 50 min. | 87.3 | 45.23 | 34.96 |
| 2. Single slice dried | 80 min. | 83.7 | 51.43 | 37.9 |
| 3. Control | Zero | 110.0 | 34.10 | 34.1 |
| 4. Draft dried | 50 min. | 94.5 | 50.00 | 42.3 |
| 5. Draft dried | 80 min. | 88.2 | 50.00 | 39.1 |

This study showed the vacuum drying is more effective on new processed bacon and overall yields are significantly improved both on a cooked basis as well as yield from original weight for new processed bacon. This study also indicated drying to 85 to 95% of original weight of green belly gives optimum product yields. Cooking of the above samples resulted in the following observations.
1. Color of new processed bacon is a darker red in the lean portion as compared to commercial bacon.
2. New processed bacon cooked more evenly with less curling than commercial bacon.
3. Less sticking to the pan occurred with new processed bacon.
4. No charring occurred with the new processed product.
5. Frying time decreased as amount of dehydration was increased.
6. Less fat and residue is left in frying pan for new processed bacon.
7. Plate coverage of individual new processed bacon slices was considerably larger than the commercial product.

EXAMPLE II

This test was conducted to demonstrate increased plate coverage (less dimensional shrink) due to dehydration. Essentially the same conditions were used as in Example I.

| I<br>New<br>Processed<br>Bacon | II<br>%<br>of Green<br>Weight | III<br>Cooked<br>Weight as<br>% of Col.<br>II | IV<br>Yield as<br>% of<br>Green<br>Weight | V<br>** % Plate<br>Coverage of<br>cooked<br>Product |
|---|---|---|---|---|
| Dehydration Time |  |  |  |  |
| Control (no dehydration) | 109.00 | 30 | 32.7 | 100%* |
| 50 min. | 96.0 | 42 | 36.99 | 116 |
| 100 min. | 83.7 | 50 | 38.39 | 135 |

*Assigned value and other values relative to 100%.
**Determined by planimeter measurements of photo copies of actual product. Same cooking comments apply as in Example I.

EXAMPLE III

This test further evaluated the improvement effect of vacuum drying on commercial (Swift Premium) bacon. Product was dried at a shelf temperature of 120° F. and at 4 mm Mercury. For those treatments where product was dried longer than 60 minutes, vacuum was reduced to 0.9 mm. Hg. for the remaining portion of the treatment.

| I<br>Dehydration<br>Time | II<br>Dehydration<br>Yield as % of<br>Green Weight | III<br>Cooked Yield<br>as % of<br>Col. II | IV<br>Overall Cooked<br>Yield as % of<br>Green Weight |
|---|---|---|---|
| Control (no vacuum) | 100.00 | 24.05 | 24.05 |
| 20 min. | 91.93 | 27.78 | 25.90 |
| 50 min. | 86.53 | 30.43 | 26.33 |
| 100 min. | 78.60 | 40.32 | 31.69 |
| 130 min. | 73.39 | 43.86 | 32.19 |

Cooking observations:
1. Dehydration of 100 min. or longer gave most even cooking.
2. Dehydration was observed to reduce cooking time.
3. No char on product dried longer than 20 minutes.

EXAMPLE IV

In this example new process bacon was prepared by combining smoking and vacuum drying steps. Bellies were first skinned, pumped with the standard commercial product pickle solution (no liquid smoke) to 116% of the original green weight and held overnight before smoking. The bellies were smoked in a standard smoke house to 127° F. and with high humidity conditions. Weight of the bellies after smoking was 104% of original weight. The bellies were then chilled and sliced and the lapped slices exposed to vacuum as in the prior examples for a period of 60 minutes to 90% of green weight. Slices were fried and resulted in a cooked yield of 34% or 30% of the green weight.

EXAMPLE V

Standard brine solution containing liquid smoke was injected into green bellies to the indicated percent of green weight. Product was dried with shelf temperature of 120° F. with 4 mm Hg first 60 min., and 0.9 mm Hg for the remainder of the time indicated. Final product temperature was between 50° and 75° F. Test was to evaluate various levels of added curing solution with regard to product attributes.

| | Results - Cooking & Overall Yields | | |
|---|---|---|---|
| I | II<br>Dehydration<br>Yield as % of<br>Green Weight | III<br>Cooked Yield<br>as % of Col. II | IV<br>Overall Yield as<br>% of Green Weight |
| 110% Pump | | | |
| Control | 105.00 | 21.95 | 23.05 |
| 80 min. | 89.20 | 31.43 | 28.03 |
| 100 min. | 85.46 | 36.76 | 31.41 |
| 120 min. | 83.86 | 38.46 | 32.25 |
| 115% Pump | | | |
| Control | 111.00 | 24.36 | 27.04 |
| 80 min. | 92.94 | 31.34 | 29.13 |
| 100 min. | 87.72 | 34.92 | 30.63 |
| 120 min. | 88.36 | 37.10 | 32.78 |
| 120% Pump | | | |
| Control | 118.00 | 25.00 | 29.50 |
| 80 min. | 92.98 | 34.85 | 32.40 |

-continued

| | Results - Cooking & Overall Yields | | |
|---|---|---|---|
| I | II Dehydration Yield as % of Green Weight | III Cooked Yield as % of Col. II | IV Overall Yield as % of Green Weight |
| 100 min. | 88.01 | 36.07 | 31.75 |
| 120 min. | 83.07 | 49.12 | 40.80 |

Conclusions
This study indicated that yields generally increase with increased hydration followed by increased dehydration. Cooking attributes and plate coverage were maximized using a 120% pump and dehydration to 70-80% of pumped weight.

EXAMPLE VI

The probable effect on shelf life of processed bacon was examined using a sample produced by injecting a green belly with curing solution to 115% of its green weight. The product was dehydrated to 85.6% of the green weight. (The cooked yield of this product was 44.23%.) The drying procedure was similar to previous examples; and the following bacterial and chemical analysis was performed on uncooked product.

| Chemical Analysis | Before Dehydration | After Dehydration |
|---|---|---|
| Water | 36.8% | 16.5% |
| Salt | .77% | 1.0% |
| Residual Nitrite | 38 PPM | 32 PPM |

| Bacteriological Analysis | Total Aerobic Count Per Gram |
|---|---|
| Before dehydration | 75,000 |
| After dehydration | 7,500 |
| 40 days after dehydration | 5,000 |
| 75 days after dehydration | 2,400 |

EXAMPLE VII

This test was conducted to demonstrate that new process bacon cooks more rapidly than commercial bacon. It also demonstrated superior cooked yield for new processed bacon, even when overcooked. The new processed bacon was prepared by injecting a green belly to 110% of green weight with a curing solution comprising salt, sugar, phosphate, liquid smoke, erythorbate, and nitrite. The belly was sliced and partially dehydrated as in the previous examples. Ten composited slices of new processed bacon and an equal number of slices of commercial bacon (taken from two 1-lb. packages) were cooked under identical conditions on a "West Bend" brand electric griddle and blotted free of excess grease upon completion of cooking. The griddle was started from an unheated condition for each test and cooking continued for measured time periods of six and nine minutes with results as follows:

| | Wt. before Cooking | Wt. Cooked | % Cooked Yield | Comment |
|---|---|---|---|---|
| 9 Minute Cook | | | | |
| New Processed bacon | 183 gm | 72 gm | 39% | Charred and Overcooked |
| Commercial bacon | 181 gm | 49 gm | 27% | Typical Cooked |
| 6 minute cook | | | | |
| New Processed bacon | 185 | 98 | 53% | Cooked but not Crisp |
| Commercial bacon | 179 | 79 | 44% | Raw Appearance Undercooked |

EXAMPLE VIII

Several other meat products were vacuum dried to the indicated weight percentages according to the conditions of the present invention previously disclosed, and evaluated for cooking attributes. These studies were done on commercially purchased products. In each instance one portion of the product was unmodified; and another portion of the product was processed by partially dehydrating under identical vacuum (29.99 in. Hg.) and fixed time conditions on a shelf heated to 120° F. to the weight percentages reported below. A summary of the cooking results is also set forth below. Cooked yield of all of the partially dehydrated products evaluated increased over the yields of the control portions. Overall cooked attributes were improved for reconstituted meat breakfast strips, bologna and pork sausage. The breakfast strip products appeared to be more crisp, which is highly desired. Vacuum drying of bologna may produce a shelf stable meat snack item.

| Item | % of Original Weight | Cooked to Doneness | Cooked Yield % | Comments |
|---|---|---|---|---|
| 1. Steak | Control 100% | 6.35 min. | 85.07% | More tender, fresher flavor |
| | Proc. 86.4% | 5 min. | 86.50% | Warm-over flavor, woody texture |
| 2. Fresh pork Sausage | Control 100% | 8 min. | 71.2% | Looser texture |
| | Proc. 91.33% | 4:30 min. | 79.1% | Denser texture, spicier, minimal charring |
| 3. Canadian bacon | Control 100% | 5 min. | 67.03% | |
| | Proc. 74.4% | 2:45 min. | 88.69% | Saltier, too dry, redder color |
| 4. Bologna | Control 100% | 3 min. | 70.2% | Charred |
| | Proc. 86.56% | 1:30 min. | 90.6% | Redder in color, soft leathery texture and good snack |
| 5. Canned ham | Control 100% | 5 min. | 73.93% | Juicier than processed - more palatable |
| | Proc. 80.49% | 2:45 min. | 85.02% | Too tough |

-continued

| Item | % of Original Weight | Cooked to Doneness | Cooked Yield % | Comments |
| --- | --- | --- | --- | --- |
| 6. Reconstituted pork breakfast strips | Control 100%<br>Proc. 85.77% | 5 min.<br>4 min. | 57.92%<br>75.56% | Chewy<br>Less greasy, redder good contrast of fat and lean, no charring |
| 7. Reconstituted beef breakfast strip | Control 100%<br>Proc. 94.49% | 5 min.<br>3 min. | 56.78%<br>74.36 | Chewy, greasy<br>Better color, less greasy |

Obviously many modifications and variations of the invention as hereinbefore set forth may be made without departing from the spirit and scope thereof, and, therefore, only such limitations should be imposed as are indicated in the appended claims.

We claim:

1. An improved method for preparing a sliced meat product for cooking and consumption, said method comprising: first hydrating a meat product with a curing pickle solution to 105%–125% of its original weight and subsequently partially dehydrating said meat product to 70%–95% of said original weight at leat in part by vacuum drying said meat product from a hydrated weight in excess of said original weight to a lower weight not in excess of 95% of said original weight, said vacuum drying being carried out while said product is maintained in a non-frozen state, and without appreciably changing the other components of the meat product, and slicing said product either before or after it is subjected to said dehydrating environment whereby said slices when subjected to cooking temperature will reach a level of doneness in a relatively shorter period of time and will have a relatively greater yield of edible meat than the same sliced product that is not subjected to said partial dehydration.

2. The method of claim 1 including the step of slicing the meat product prior to the step of vacuum drying.

3. The method of claim 1 wherein the meat product is a sliced bacon type product.

4. The method of claim 1 wherein the meat product is bacon and the hydrated bacon is also heated to a temperature of 125°–130° F. and thereby dehydrated to a weight in excess of said original weight prior to slicing and vacuum drying.

* * * * *